United States Patent
Kim

(10) Patent No.: US 10,084,408 B2
(45) Date of Patent: Sep. 25, 2018

(54) VEHICLE MOTOR DRIVE CIRCUIT

(71) Applicant: HYUNDAI MOBIS CO., LTD., Seoul (KR)

(72) Inventor: Nack Jun Kim, Yongin (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 357 days.

(21) Appl. No.: 14/512,922

(22) Filed: Oct. 13, 2014

(65) Prior Publication Data

US 2015/0137714 A1    May 21, 2015

(30) Foreign Application Priority Data

Nov. 20, 2013  (KR) .................. 10-2013-0141233

(51) Int. Cl.
| H02M 1/14 | (2006.01) |
| H02H 3/10 | (2006.01) |
| H02P 3/04 | (2006.01) |
| H02P 29/02 | (2016.01) |
| H02P 29/032 | (2016.01) |
| H02P 7/285 | (2016.01) |

(52) U.S. Cl.
CPC .......... *H02P 29/022* (2013.01); *H02P 29/032* (2016.02); *H02P 7/285* (2013.01)

(58) Field of Classification Search
CPC ................... B60L 3/04; B60L 11/14
See application file for complete search history.

(56) References Cited

U.S. PATENT DOCUMENTS

| 5,483,404 | A | * | 1/1996 | Nakano ............... H02H 5/105 361/18 |
| 6,495,938 | B2 | * | 12/2002 | Naito .................. H02K 5/225 310/68 R |
| 7,100,368 | B2 | * | 9/2006 | Ito ....................... F01N 3/22 60/277 |
| 2009/0109588 | A1 | * | 4/2009 | Hayama ............. H03K 17/18 361/93.1 |
| 2011/0215638 | A1 | * | 9/2011 | Sakuma ............. B60T 13/16 303/11 |

FOREIGN PATENT DOCUMENTS

KR   10-2010-0025135 A   3/2010

* cited by examiner

*Primary Examiner* — Bickey Dhakal
*Assistant Examiner* — Charles S Laughlin

(57) ABSTRACT

Disclosed are a vehicle motor drive circuit and a driving method thereof. In the vehicle motor drive circuit according to the present invention, when the floating voltage is generated on the digital ground line due to a short circuit or a poor contact, the switch control signal is connected to the motor ground power supply to lower the signal level of the switch control signal in response to the voltage difference produced between the digital ground line and the motor ground line. Therefore, it is possible to prevent an erroneous operation of the motor switch or the motor. Accordingly, it is possible to prevent a damage of the motor or the motor switch and a secondary problem caused by unintentional operation of the motor.

10 Claims, 2 Drawing Sheets

[FIG. 1]
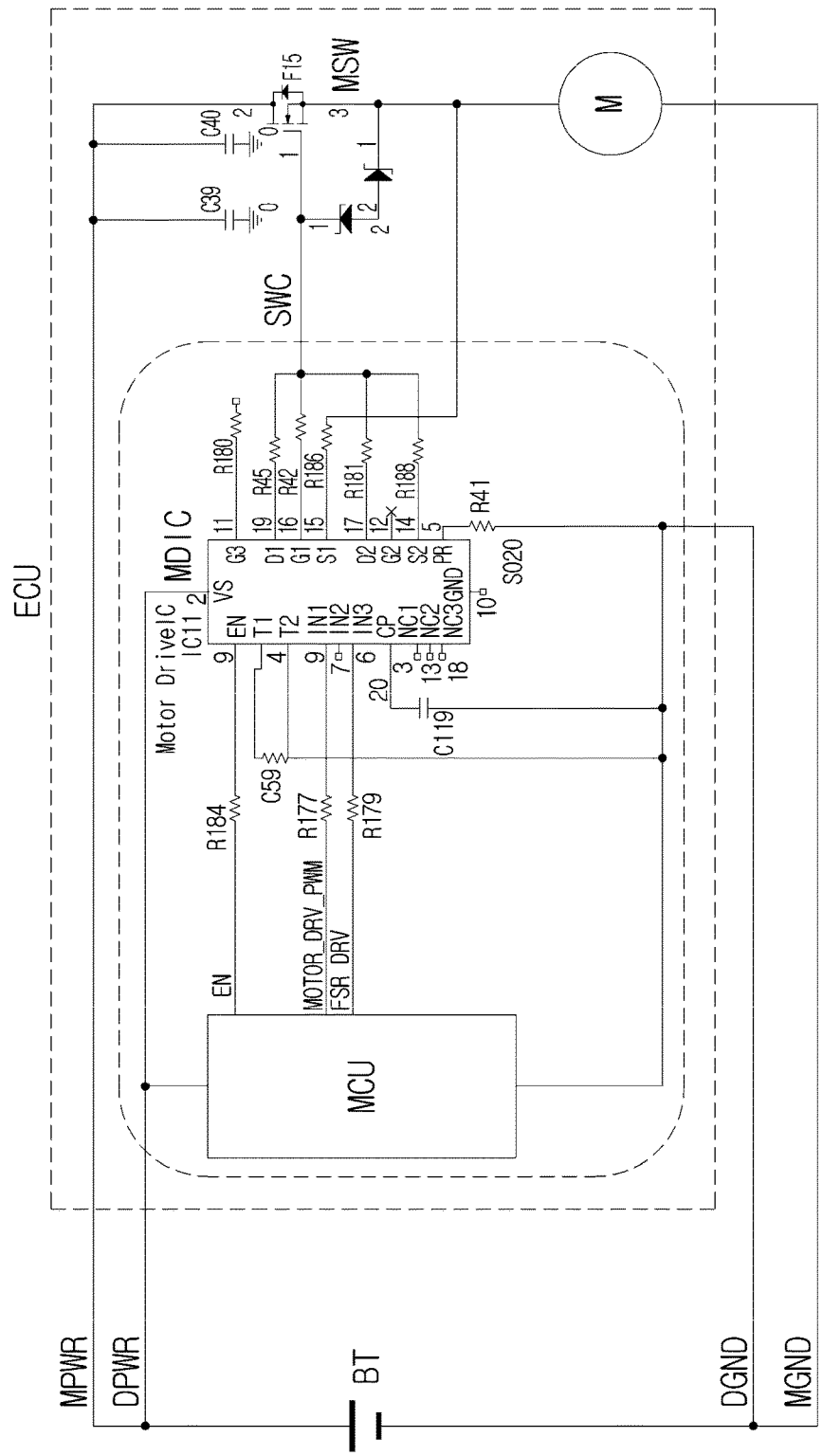
--Prior Art--

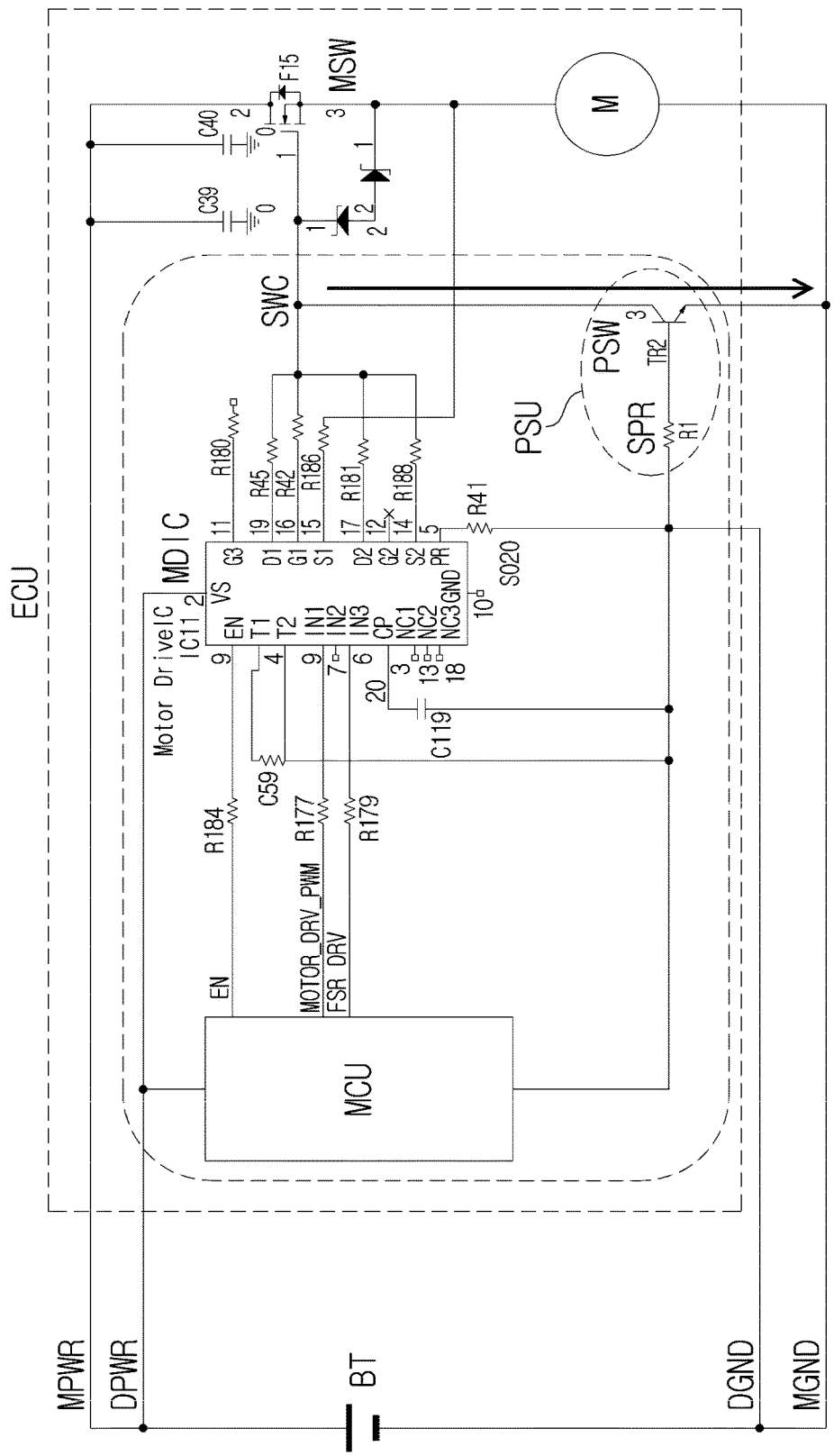
[FIG. 2]

VEHICLE MOTOR DRIVE CIRCUIT

CROSS-REFERENCE TO RELATED APPLICATIONS

This application claims priority to and the benefit of Korean Patent Application No. 10-2013-0141233 filed in the Korean Intellectual Property Office on Nov. 20, 2013, the entire contents of which are incorporated herein by reference.

TECHNICAL FIELD

The present invention relates to a vehicle motor drive circuit, and more particularly, to a vehicle motor drive circuit capable of preventing an abnormal operation of a motor caused by a disconnection of a digital ground line.

BACKGROUND ART

Most of vehicles are provided with various safety devices and convenience devices in addition to essential components for running a vehicle. In operation of recent vehicles, such safety and convenience devices are now considered indispensable rather than simply incidental.

As a typical safety device currently applied to a vehicle, there is known an electronic stability control (ESC) unit. The ESC basically has an anti-lock braking system (ABS) functionality and a traction control system (TCS) functionality. The ESC includes various sensors that obtain information necessary in the operation of the ESC, a power generating unit that generates physical power to control components such as a brake, and a control unit that gathers the information obtained from the sensors, determines whether or not the power generating unit is operated, and controls the power generating unit. It is noted that, although the power generating unit may be a hydraulic unit or a pneumatic unit, most of the units generate power by driving motors, so that it is recognized that the power generating unit is implemented using a motor. In addition, the control unit is a circuit for controlling driving of a motor serving as the power generating unit and may be included in an electric control unit ECU currently employed in most of vehicles.

Some of convenience devices also use a motor as a power generating unit and drives the motor under control of a motor drive circuit.

FIG. 1 illustrates an exemplary motor drive circuit of the related art, and more particularly, an ECU drive circuit of an ABS unit.

Referring to FIG. 1, the motor drive circuit of the related art includes a battery BT, a control unit ECU, and a motor M. Since the control unit is generally implemented in the ECU as described above, it is denoted by "ECU" in FIG. 1.

In FIG. 1, a power voltage supplied from a positive (+) terminal of the battery BT is divided into a motor power voltage MPWR and a digital power voltage DPWR using different lines, and the divided voltages MPWR and DPWR are applied to the motor M and the control unit ECU, respectively. Similarly, a ground voltage supplied from a negative (−) terminal of the battery BT is divided into a motor ground voltage MGND and a digital ground voltage DGND using different lines, and is the divided voltages MGND and DGND are applied to the motor M and the control unit ECU, respectively. The motor power voltage MPWR and the motor ground voltage MGND applied to the motor M are utilized as power for driving the motor, and the digital power voltage DPWR and the digital ground voltage DGND are utilized as power for operating the control unit ECU.

The motor M receives the motor power voltage MPWR and the motor ground voltage MGND applied from the battery BT and is driven under control of the control unit ECU.

The control unit ECU includes a micro control unit (MCU), a motor driving IC MDIC, and a motor switch MSW. The MCU transmits a plurality of control signals EN, PWM, FSR_DRV for driving the motor M using the motor driving IC MDIC, and the motor driving IC MDIC outputs a switch control signal SWC for turning on or off the motor switch MSW in response to the plurality of control signals EN, PWM, and FSR_DRV. The signal EN out of a plurality of control signals is a control signal for activating the motor driving IC MDIC, and the signal PWM is a pulse modulation signal for adjusting a switching timing of the motor switch MSW. The signal FSR DRV is a signal for driving a solenoid valve (not illustrated in FIG. 1). The motor switch MSW is turned on or off in response to the switch control signal SWC applied from the motor driving IC MDIC to supply the motor power voltage MPWR to the motor M and drive the motor M.

Under a normal condition, if the switch control signal SWC output from the motor driving IC MDIC has a first level (for example, a high level), the motor switch MSW is turned on, so that the motor M is driven by receiving the motor power voltage MPWR. Otherwise, if the switch control signal SWC has a second level (for example, a low level), the motor switch MSW is turned off, so that the driving of the motor M stops.

However, the operation described above is performed under a normal condition. Since the motor power voltage MPWR, the digital power voltage DPWR, the motor ground voltage MGND, and the digital ground voltage DGND are connected to the battery through different lines using wires and connectors, the motor power voltage MPWR, the digital power voltage DPWR, the motor ground voltage MGND, and the digital ground voltage DGND applied from the battery BT may have a problem such as disconnection or poor contact of the corresponding line due to a user's mistakes, aging, and the like.

The motor power voltage MPWR, the digital power voltage DPWR, and the motor ground voltage MGND suffer from only a problem that the motor M is not driven. Meanwhile, if there is a problem such as disconnection or poor contact in the digital ground voltage DGND line that supplies the ground power supply to the ECU, a floating voltage may be generated on a signal output from each component of the control unit ECU including the motor driving IC MDIC. If the floating voltage flows into the switch control signal SWC that is a signal output from the motor driving IC MDIC, the motor switch MSW is turned on unintentionally, so that the motor M is driven continuously. Accordingly, the unintentional operation of the motor may hinder safe driving and shorten a service life of the motor. Furthermore, there is a problem that the motor switch MSW may be damaged by heat.

In Korean Patent Laid-open Publication No. 2013-0080505, there is discussed a technique of stopping a motor operation by detecting a short circuit. However, this technique is limited to an electric vehicle and is not suitable for a drive circuit of a motor included in the safety devices and the convenience devices of vehicles including a general purpose vehicle. In addition, since this technique is used to stop driving of a motor of an electric vehicle in the event of a short circuit and the like, it is not a countermeasure to the case where the power line is disconnected. In addition, since this technique is used to simply stop driving of a motor, it may fail to provide a capability as a motor.

SUMMARY OF THE INVENTION

The present invention has been made in an effort to provide a vehicle motor drive circuit capable of protecting a motor and a motor switch so that a damage of the motor and the motor switch is avoided even though there is a disconnection or a poor contact of a digital ground line.

According to an aspect of the invention, there is provided A vehicle motor drive circuit comprising: a battery that supplies a motor power voltage, a digital power voltage, a motor ground voltage, and a digital ground voltage through a motor power voltage line, a digital power voltage line, a motor ground voltage line, and a digital ground voltage line, respectively; a motor driven by receiving the motor power voltage and the motor ground voltage; and a control unit that is driven by receiving the digital power voltage and the digital ground voltage, controls an operation of the motor by generating a switch control signal for controlling whether or not the motor power voltage is applied to the motor, detects a voltage difference between the motor ground voltage line and the digital ground voltage line, and lowers a voltage level of the switch control signal into the motor ground voltage level when a floating voltage is generated on the digital ground voltage line.

The control unit may include: a motor switch that is disposed in the motor power voltage line and the motor and applies the motor power voltage to the motor in response to the switch control signal, a micro control unit that is driven by receiving the digital power voltage and the digital ground voltage and generates and outputs at least one of control signals for controlling driving of the motor, a motor driving IC that is driven by receiving the digital power voltage and the digital ground voltage and generates and outputs the switch control signal in response to at least one of control signals applied from the MCU, a protection switch unit that lowers a voltage level of the switch control signal applied from the motor driving IC to the motor switch into the motor ground voltage level and turns off the motor switch in response to the voltage difference between the motor ground voltage line and the digital ground voltage line.

The protection switch unit may include: a protection switch implemented with a transistor having a gate connected to the digital ground voltage line, an emitter connected to the motor ground voltage line, and a collector connected to a terminal of the motor driving IC where the switch control signal is output.

The protection switch unit may further include: a protection resistor connected between the digital ground voltage line and the gate of the protection switch to protect the protection switch.

Therefore, in the vehicle motor drive circuit according to the present invention, when the floating voltage is generated on the digital ground line due to a short circuit or a poor contact, the switch control signal is connected to the motor ground power supply to lower the signal level of the switch control signal in response to the voltage difference produced between the digital ground line and the motor ground line. Therefore, it is possible to prevent an erroneous operation of the motor switch or the motor. Accordingly, it is possible to prevent a damage of the motor or the motor switch and a secondary problem caused by unintentional operation of the motor.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 1 illustrates an exemplary motor drive circuit of the related art.

FIG. 2 illustrates an exemplary motor drive circuit according to an embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

In order to sufficiently understand the present invention, the operational advantages of the present invention, and the objectives achieved by the exemplary embodiments of the present invention, the accompanying drawings illustrating preferred embodiments of the present invention and the contents described therein need to be referred to.

Hereinafter, the present invention will be described in detail by describing an exemplary embodiment of the present invention with reference to the accompanying drawings. However, the present invention can be realized in various different forms, and is not limited to the exemplary embodiments described herein. For clear description of the present invention, parts not associated with the description will be omitted and like reference numerals of the drawings refer to like elements.

Throughout the specification and the claims, unless explicitly described to the contrary, the word "comprise" and variations such as "comprises" or "comprising" will be understood to imply the inclusion of stated elements but not the exclusion of any other elements. The terms "-er", "-or", "module", "block" described in the specification mean units for processing at least one function and operation and can be implemented by hardware components or software components and combinations thereof.

FIG. 2 illustrates an exemplary motor drive circuit according to an embodiment of the present invention.

Referring to FIG. 2, similar to FIG. 1, the motor drive circuit of the present invention includes a battery BT, a control unit ECU, and a motor M. Similarly, in FIG. 2, the control unit ECU was expressed as ECU, assuming that the control unit is included in the ECU.

Similarly, in FIG. 2, a motor power voltage MPWR and a digital power voltage DPWR are connected to a positive (+) terminal of the battery BT through a motor power voltage MPWR line and a digital power voltage DPWR line, respectively, formed of wires and connectors, and are applied to the motor M and the motor drive unit ECU, respectively. Similarly, a motor ground voltage MGND and a digital ground voltage DGND are connected to a negative (−) terminal of the battery BT through a motor ground voltage MGND line and a digital ground voltage DGND line, respectively, formed of wires and connectors, and are applied to the motor M and the motor drive unit ECU, respectively. The motor power voltage MPWR and the motor ground voltage MGND applied to the motor M are utilized as power for driving the motor, and the digital power voltage DPWR and the digital ground voltage DGND are utilized as power for operating the control unit ECU.

The motor M receives the motor ground voltage MGND applied from the battery BT, and is driven in response to the motor power voltage MPWR applied through the motor switch MSW that is turned on or off under control of the control unit ECU.

According to an embodiment of this disclosure, the control unit ECU includes a micro control unit MCU, a motor driving IC MDIC, a motor switch MSW, and a protection switch unit PSU. The MCU MCU transmits signals EN, PWM, and FSR_DRV as control signals for driving the motor M using the motor driving IC MDIC.

The motor driving IC MDIC is activated in response to the signal EN out of a plurality of control signals (EN, PWM, and FSR_DRV) and outputs a switch control signal SWC for turning on or off the motor switch MSW in response to the signal PWM.

The motor switch MSW is turned on or off in response to the switch control signal SWC applied from the motor driving IC MDIC. In addition, the turned-on motor switch MSW supplies the motor power voltage MPWR to the motor M to drive the motor M.

The motor switch MSW may be implemented with a field effect transistor (FET) having a gate that receives the switch control signal, a source that receives the motor power voltage, and a drain connected to the motor M that applies the motor power voltage MPWR to the motor M.

Meanwhile, the control unit ECU according to the present invention further includes a protection switch unit PSU unlike the control unit illustrated in FIG. 1. The protection switch unit PSU senses a voltage difference between the digital ground voltage DGND and the motor ground voltage MGND and lowers a level of the switch control signal SWC output from the motor driving IC MDIC into a voltage level of the motor ground voltage MGND when the voltage difference is generated between the digital ground voltage DGND and the motor ground voltage MGND.

The protection switch unit PSU includes a protection switch PSW and a protection resistor SPR. The protection switch PSW can be implemented with a transistor having a gate connected to the digital ground voltage DGND, an emitter connected to the motor ground voltage MGND, and a collector connected to an output terminal of the switch control signal SWC of the motor driving IC MDIC. The transistor is turned on and sends the current applied to the collector to the emitter when a voltage difference is generated between the gate and the emitter due to the nature of the operation. Therefore, the protection switch PSW according to the present invention is turned on automatically by the voltage difference between the digital ground voltage DGND and the motor ground voltage MGND when a floating voltage is generated on the digital ground voltage DGND due to disconnection, poor contact, and so on. The turned-on protection switch PSW drops a voltage level of the switch control signal SWC connected to the collector into a voltage level of the motor ground voltage MGND connected to the emitter.

Therefore, even when a floating voltage is applied to a signal (here, the switch control signal SWC) output from each component of the control unit ECU, including the motor driving IC MDIC, due to a floating voltage generated on the digital ground voltage DGND, the protection switch PSW lowers a voltage level of the switch control signal SWC into that of the motor ground voltage MGND, so that the turn-off state of the motor switch MSW can be maintained. That is, it is possible to prevent an unintentional driving of the motor and a damage of the motor switch generated as the floating voltage is applied.

The protection resistor SPR is a switch protection resistor for preventing a damage of the protection switch PSW caused when the floating voltage is directly applied to the gate of the protection switch PSW.

As a result, in the motor drive circuit according to the present invention, the control unit ECU further includes a protection switch unit PSU, and the protection switch unit PSU detects a voltage difference between the digital ground voltage DGND and the motor ground voltage MGND to determine whether or not a floating voltage is generated on the digital ground voltage DGND. In addition, when the floating voltage is generated, a voltage level of the switch control signal SWC is lowered into that of the motor ground voltage MGND, so that a damage of the motor M and the motor switch MSW is prevented by suppressing the motor switch MSW from being unintentionally turned on.

Although the present invention has been described with reference to exemplary embodiments illustrated in drawings, they are merely for illustrative purposes. It will be appreciated by those skilled in the art that various modifications and equivalents of the present invention may be possible without departing from the spirit and scope of the invention.

Accordingly, the true technical scope of the present invention is limited only by the appended claims and equivalents thereof.

Meanwhile, the embodiments according to the present invention may be implemented in the form of program instructions that can be executed by computers, and may be recorded in computer readable media. The computer readable media may include program instructions, a data file, a data structure, or a combination thereof. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A vehicle motor drive circuit comprising:
a battery that supplies a motor power voltage, a digital power voltage, a motor ground voltage, and a digital ground voltage through a motor power voltage line, a digital power voltage line, a motor ground voltage line, and a digital ground voltage line, respectively;
a motor coupled between the motor power voltage line and the motor ground voltage line, the motor being driven by receiving the motor power voltage and the motor ground voltage; and
a control unit driven by receiving the digital power voltage and the digital ground voltage, the control unit including a motor driving IC (MDIC) and a protection switch unit, the MDIC selectively connecting the motor to the power voltage line by outputting a switch control signal, the protection switch unit detecting a voltage difference between the motor ground voltage line and the digital ground voltage line and lowering a voltage level of the switch control signal to a voltage level of the motor ground voltage line when the voltage difference is detected,
wherein the protection switch unit includes a transistor having a gate connected to the digital ground voltage line, an emitter connected to the motor ground voltage line, and a collector directly connected to the switch control signal output by the MDIC.

2. The vehicle motor drive circuit according to claim 1, wherein the control unit further includes:
a motor switch that is coupled between the motor power voltage line and the motor, the motor switch applying the motor power voltage to the motor in response to the switch control signal, and
a micro control unit (MCU) that is driven by receiving the digital power voltage and the digital ground voltage, the MCU generating and outputting at least one of a plurality of control signals for controlling the motor,
wherein the MDIC is driven by receiving the digital power voltage and the digital ground voltage, the MDIC generating and outputting the switch control signal in response to at least one of the plurality of control signals generated and output by the MCU, and wherein the motor switch is turned off when the voltage level of the switch control signal is lowered to the motor ground voltage level.

3. The vehicle motor drive circuit according to claim 1, wherein the protection switch unit further includes a protection resistor connected between the digital ground voltage line and the gate of the transistor.

4. The vehicle motor drive circuit according to claim 2, wherein the motor switch is a field effect transistor (FET) having a source connected to the motor power voltage line, a drain connected to the motor, and a gate connected to the switch control signal.

5. The vehicle motor drive circuit according to claim 1, wherein the control unit is an electronic control unit (ECU) of the vehicle.

6. The vehicle motor drive circuit according to claim 1, wherein the motor is provided in an anti-lock braking system (ABS) unit.

7. A circuit, comprising:
a motor coupled between a motor power voltage line and a motor ground voltage line;
a motor driving integrated circuit (IC) coupled between a digital power voltage line and a digital ground voltage line, the motor driving IC outputting a switch control signal to an output terminal;
a motor switch coupled between the motor power voltage line, the output terminal, and the motor, the motor switch configured to connect the motor to the motor power voltage line based on the switch control signal; and
a protection switch coupled between the output terminal, the motor ground voltage line, and the digital ground voltage line, the protection switch connecting the output terminal of the switch control signal to the motor ground voltage line when the digital ground voltage line has a different voltage than the motor ground voltage line,
wherein the protection switch includes a transistor having a gate connected to the digital ground voltage line, an emitter connected to the motor ground voltage line, and a collector directly connected to the switch control signal output by the motor driving IC.

8. The circuit of claim 7, further comprising:
a micro control unit (MCU) coupled between the digital power voltage line and the digital ground voltage line, the MCU outputting a plurality of control signals to the motor driving IC,
wherein the motor driving IC outputs the switch control signal based on the plurality of control signals received from the MCU.

9. The circuit of claim 7, wherein the protection switch lowers a voltage level of the switch control signal when the digital ground voltage line has a different voltage than the motor ground voltage line.

10. The circuit of claim 7, further comprising:
a battery including a positive terminal and a negative terminal, the positive terminal being connected to the motor power voltage line and the digital power voltage line, the negative terminal being connected to the motor ground voltage line and the digital ground voltage line.

* * * * *